United States Patent
Kihara et al.

(10) Patent No.: US 9,837,728 B2
(45) Date of Patent: Dec. 5, 2017

(54) ELECTRICAL WIRE WITH TERMINAL, AND WIRE HARNESS STRUCTURE

(71) Applicants: FURUKAWA ELECTRIC CO., LTD., Tokyo (JP); FURUKAWA AUTOMOTIVE SYSTEMS, INC., Inukami-gun (JP); TOYOTA JIDOSHA KABUSHIKI KAISHA, Toyota-shi (JP)

(72) Inventors: Yasushi Kihara, Tokyo (JP); Kyutaro Abe, Tokyo (JP); Yukihiro Kawamura, Inukami-gun (JP); Takashi Tonoike, Inukami-gun (JP); Takahito Nakashima, Okazaki (JP); Hiroshi Kobayashi, Okazaki (JP); Hiroyasu Taga, Toyota (JP)

(73) Assignees: FURUKAWA ELECTRIC CO., LTD., Tokyo (JP); FURUKAWA AUTOMOTIVE SYSTEMS, INC., Inukami-gun (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/506,522

(22) PCT Filed: Aug. 25, 2015

(86) PCT No.: PCT/JP2015/073792
§ 371 (c)(1),
(2) Date: Feb. 24, 2017

(87) PCT Pub. No.: WO2016/031798
PCT Pub. Date: Mar. 3, 2016

(65) Prior Publication Data
US 2017/0274844 A1    Sep. 28, 2017

(30) Foreign Application Priority Data

Aug. 25, 2014  (JP) ................................. 2014-170564

(51) Int. Cl.
*H01R 4/20*      (2006.01)
*B60R 16/02*     (2006.01)
(Continued)

(52) U.S. Cl.
CPC ............ *H01R 4/206* (2013.01); *B60K 37/06* (2013.01); *B60R 16/0215* (2013.01);
(Continued)

(58) Field of Classification Search
CPC ............................... H01R 4/203; H01R 4/206
See application file for complete search history.

(56) References Cited

U.S. PATENT DOCUMENTS

2002/0096352 A1   7/2002 Kuwayama et al.
2004/0157505 A1   8/2004 Kuwayama et al.
(Continued)

FOREIGN PATENT DOCUMENTS

JP    2002-216862 A    8/2002
JP    2006-331931 A   12/2006
(Continued)

OTHER PUBLICATIONS

Japanese Office Action dated May 30, 2017 in Patent Application No. 2016-545535 (with English translation).
(Continued)

*Primary Examiner* — James Harvey
(74) *Attorney, Agent, or Firm* — Oblon, McClelland, Maier & Neustadt, L.L.P.

(57) ABSTRACT

A covered conductive wire is configured by covering a conductive wire with an insulating cover portion. The conductive wire is formed of an aluminum-based material, for (Continued)

example. A crimping portion includes a cover crimping portion for crimping the cover portion of the covered conductive wire, and a conductor crimping portion for crimping a portion of the conductive wire that is exposed when the cover portion is removed at the tip portion of the covered conductive wire. It is possible to use polyvinyl chloride and/or a non-halogen member, for example, for the cover portion of the covered conductive wire, and a plasticizer, filler, stabilizer, or the like is compounded as needed. A material that shrinks by a factor of 7% or less after being allowed to stand for 120 hours at a high temperature of 120° C. is used for this cover portion.

8 Claims, 11 Drawing Sheets

(51) Int. Cl.

| | | |
|---|---|---|
| *H01R 9/24* | (2006.01) | |
| *H01R 12/51* | (2011.01) | |
| *B60K 37/06* | (2006.01) | |
| *H01R 11/09* | (2006.01) | |
| *H01R 4/18* | (2006.01) | |

(52) U.S. Cl.
CPC ........... *H01R 4/183* (2013.01); *H01R 9/2416* (2013.01); *H01R 11/09* (2013.01); *H01R 12/515* (2013.01); *H01R 4/203* (2013.01)

(56) References Cited

U.S. PATENT DOCUMENTS

| | | | |
|---|---|---|---|
| 2011/0045697 A1* | 2/2011 | Sawamura | B60R 16/0207 439/587 |
| 2013/0273787 A1* | 10/2013 | Mitose | H01R 4/185 439/878 |
| 2013/0303019 A1* | 11/2013 | Ito | H01R 13/5205 439/521 |
| 2014/0378009 A1* | 12/2014 | Yamada | H01R 4/187 439/865 |
| 2015/0079857 A1 | 3/2015 | Kawamura et al. | |
| 2015/0126078 A1 | 5/2015 | Kawamura et al. | |
| 2015/0126079 A1* | 5/2015 | Kawamura | H01R 4/206 439/877 |
| 2015/0357724 A1 | 12/2015 | Okuno et al. | |

FOREIGN PATENT DOCUMENTS

| | | |
|---|---|---|
| JP | 5547357 B1 | 7/2014 |
| JP | 2015-125978 A | 7/2015 |
| WO | 2014/014103 A1 | 1/2014 |

OTHER PUBLICATIONS

International Search Report dated Nov. 10, 2015, in PCT/JP2015/073792, filed Aug. 25, 2015.

* cited by examiner

ELECTRICAL WIRE WITH TERMINAL, AND WIRE HARNESS STRUCTURE

TECHNICAL FIELD OF THE INVENTION

This invention relates to an electrical wire with a terminal (hereinafter, a terminal-equipped electrical wire) and the like that are used for motor vehicles and the like.

BACKGROUND OF THE INVENTION

For connecting an electrical wire and a terminal in a wire harness for motor vehicles, crimp joining, in which an electrical wire caulked and crimped by a terminal called open-barrel type, has been commonly known. However, in such a wire harness, if moisture or the like adheres to the connecting part of the electrical wire and the terminal, oxidization of the surface of the metal used for the electrical wire progresses, increasing the resistance at the joint part. Also, if different metals are used for the electrical wire and the terminal, corrosion between different metals may progress. The progress of corrosion of metal materials at the connecting part causes cracks or contact failure at the connecting part, and its effect on product life is unavoidable. Particularly in recent years, a wire harness having electrical wires made of aluminum alley and terminals made of copper alloy has been in practical use, the problem of corrosion at the joint part has became noteworthy.

Here, if moisture adheres to the contacting part of different metals such as aluminum and copper for example, so-called electrolytic corrosion may occur due to difference in corrosion potential. Since the potential difference between aluminum and copper is especially large, corrosion on the side of aluminum, which is an electrically base metal, progresses. Thus, the connection state between a conductive wire and a crimp terminal becomes unstable, causing an increase in contact resistance or in electrical resistance due to decrease in wire diameters, and, furthermore, disconnection of the wire, which may result in malfunction or breakdown of the electrical components.

For such a wire harness having different metals contacting with each other, a method using a terminal having a tubular crimping portion of which one end is closed has been proposed, for example (Patent Document 1): the method includes inserting an end part of an electrical wire into the tubular crimping portion, and then crimping the tubular crimping portion by caulking so as to prevent the end part of the core wires from adhesion of moisture such as rain water or sea water.

RELATED ART

Patent Documents

[Patent Document 1] Japanese Unexamined Patent Application Publication No. 2006-331931 (JP-A-2006-331931)

SUMMARY OF THE INVENTION

Problems to be Solved by the Invention

However, with a crimping portion having an end part sealed as in Patent Document 1, water may enter from the crimping portion when adhesion is not sufficient especially after being held at a high temperature.

The present invention was achieved in view of such problems. Its object is to provide a terminal-equipped electrical wire and the like that can have high water cut-off performance.

Means for Solving Problems

To achieve the above object, a first invention provides a terminal-equipped electrical wire including a covered conductive wire connected with a terminal. The terminal includes a crimping portion, which crimps the covered conductive wire, and a terminal body. The crimping portion is in a tubular shape with a sealed end and includes a cover crimping portion, which crimps a cover portion, and a conductor crimping portion, which crimps a conductive wire exposed from the cover portion. The resin forming the cover portion shrinks by a factor of 7% or less after being left at a high temperature of 120° C. for 120 hours.

It is preferable that a compression rate of the cover crimping portion is 80% or less.

The cover crimping portion may include a protruded linear-portion that protrudes toward an inner surface of the cover crimping portion and is provided as a ring shape in a circumferential direction. On the outer circumference surface of the protruded linear-portion, a recess groove corresponding to the protruded linear-portion may be formed.

A plurality of the protruded linear-portions may be provided at intervals in a longitudinal direction of the cover crimping portion.

According to the first invention, after being held at a high temperature, the shrinkage ratio is still below a predetermined value and thus high compression force can be obtained. Thus, adhesion between the cover portion and the terminal is maintained at high temperatures. This can prevent moisture entry from a gap between the crimp terminal and the cover portion into the terminal and adhesion of water to the contacting part of the electrical wire and the terminal.

In addition, if the compression rate of the cover crimping portion is great than 80%, it is different to obtain the high compression force at the time of crimping and is difficult to maintain the compression force greater than the predetermined value when being held at high temperatures. Thus, in the present invention, the compression rate is preferably 80% or less.

In addition, by providing the ring-shaped protruded linear-portion, which protrudes toward the inner surface of the cover crimping portion, in the circumferential direction of the insulating cover portion, water tightness can be obtained with certainty for all the areas in the circumferential direction.

Moreover, providing a plurality of the protruded linear-portions in the longitudinal direction can further improve the water tightness.

A second invention provides a wire harness structure in which a plurality of the terminal-equipped electrical wires according to the first invention are bundled together.

In the protein invention, a plurality of the terminal-equipped electrical wires can be bundled together in use.

Effects of the Invention

The present invention can provide a terminal-equipped electrical wire and the like that can have high water cut-off performance.

BRIEF DESCRIPTION OF DRAWINGS

FIG. 6 (*b*) is a cross-sectional view showing the crimping portion 5 disposed between the mold 31*a* and the mold 31*b* after crimping.

FIG. 7 (*b*) is cross-sectional view showing the crimping portion 5 disposed between the mold 35*a* and the mold 35*b* after crimping.

DESCRIPTION OF SOME EMBODIMENTS

Figure 1:
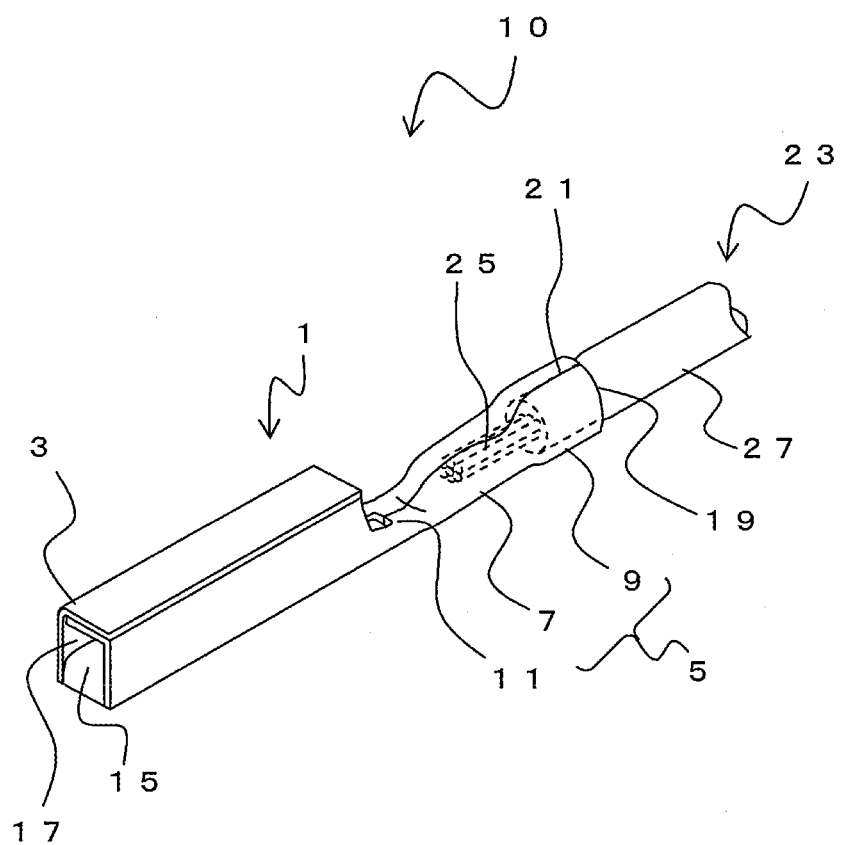
FIG. 1 is a perspective view of a terminal-equipped electrical wire 10.
Figure 2:
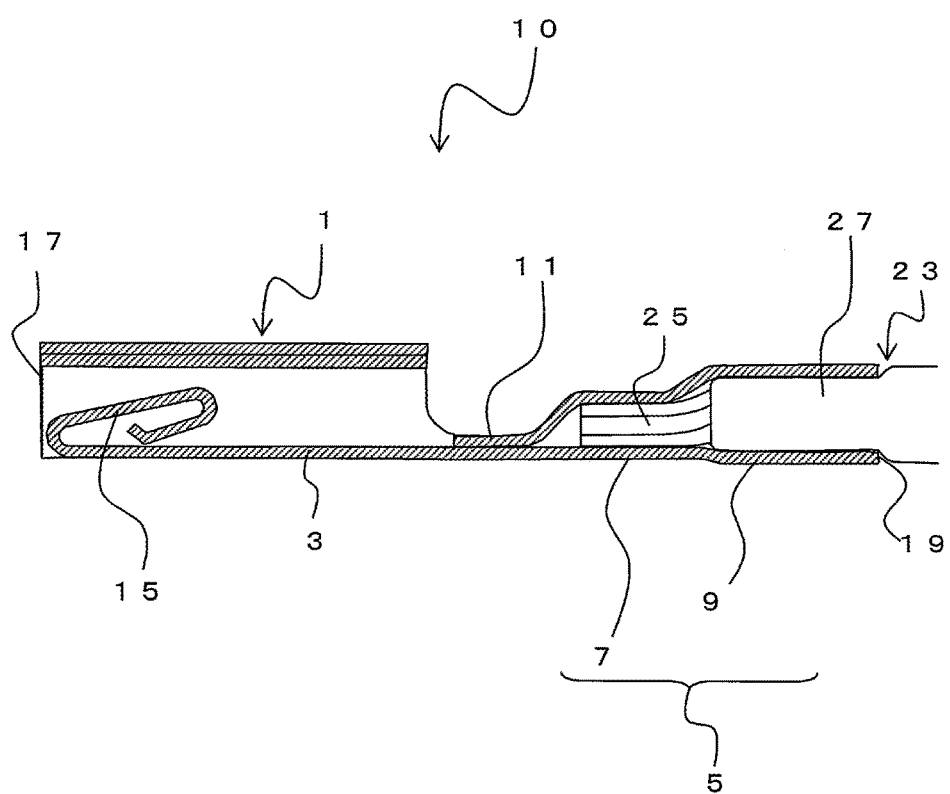
FIG. 2 is a cross-sectional view of the terminal-equipped electrical wire 10.

FIG. 1 is a perspective view showing a terminal-equipped electrical wire 10 according to an embodiment of the present invention, and FIG. 2 is a cross-sectional view in an axial direction of the terminal-equipped electrical wire 10. The terminal-equipped electrical wire 10 includes a terminal 1 and a covered conductive wire 23 that are crimped together.

The covered conductive wire 23 includes a conductive wire 25 covered by an insulating cover portion 27. The conductive wire 25 is made of, for example, aluminum based material. When inserting the covered conductive wire 23 into a crimping portion 5 of the terminal 1, a part of the cover portion 27 at the tip of the covered conductive wire 23 is removed to expose the conductive wire 25. For the cover portion 27, any of commonly used materials in this technical field, such as polyvinyl chloride (PVC) or polyethylene, can be chosen.

The terminal 1 is made of copper and includes a terminal body 3 and the crimping portion 5 to which the covered conductive wire 23 is crimped. The terminal body 3 is made of a plate-like member of a predetermined shape that is formed into a tubular body having a rectangular cross section. The terminal body 3 has an elastic contacting piece 15, which is formed by folding the plate-like member into the rectangular tubular body, at a front-end portion 17. The terminal body 3 is connected to a male terminal or the like that is to be inserted from the front-end portion 17.

The crimping portion 5 is formed by rolling up a plate-like material into a cylinder having a circular cross section, and the side edges of the plate-like material are butted to each other and joined at a joint portion 21 to be integrated. The covered conductive wire 23 is inserted into the tubularly formed crimping portion 5 from a rear-end portion 19. In addition, a sealed portion 11 is provided at the front end of the crimping portion 5 (on the side of the terminal body 3). That is, the crimping portion 5 is in a substantially tubular shape with a sealed end, and parts of the crimping portion 5 except for the rear-end portion 19 into which the covered conductive wire is to be inserted are sealed. The joint portion 21 and the sealed portion 11 are welded by, for example, laser welding or the like.

The crimping portion 5 includes a cover crimping portion 9, which crimps the cover portion 27 of the covered conductive wire 23, and a conductor crimping portion 7, which crimps the conductive wire 25 that is exposed by removing the cover portion 27 at a tip part of the covered conducive wire 23.

As mentioned above, polyvinyl chloride or non halogen material, for example, can be used for the cover portion 27 of the covered conductive wire 23, which may be mixed with plasticizer, filler, and/or stabilizer as required.

Figure 3:
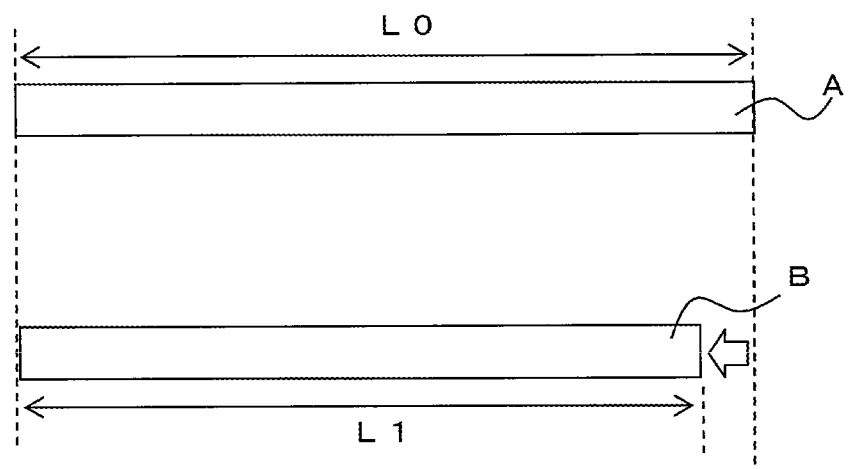
FIG. 3 is a drawing showing a definition of shrinkage ratio.

A material that shrinks by a factor of 7% or less after being left at a high temperature of 120° C. for 120 hours is used for resin forming the cover portion 27 of the present invention. FIG. 3 is a drawing illustrating a method for defining the shrinkage ratio. The rover portion 27 of a length of 20 mm is taken out from the tip of the covered conductive wire 23. This cover portion 27 alone is left at a high temperature of 120° C. for 120 hours. The shrinkage ratio at this occasion is defined as (L0−L1)/L0, wherein the length before heating (A in the drawing) is L0, and the length after heating (B in the drawing) is L1.

To adjust the shrinkage ratio of the cover portion 27, the material or blending quantity of the plasticizer that is to be added to the cover portion 27, for example, should be adjusted. As plasticizers, phthalate, adipic acid, phosphoric acid, and trimellitic acid based materials may be used, for example.

A material that shrinks by a factor of 7% or less can be used for the present invention. If the shrinkage ration exceeds 7%, the compression force of the cover portion 27 against the inner surface of the cover crimping portion 9 decreases after heating. If a desired compression force cannot be obtained, the adhesive force between the cover portion 27 and the cover crimping portion 9 is insufficient and water entry may occur. The quantity of each of the added plasticizers is decided as appropriate, evaluating the relationship between added quantity and shrinkage ratio, so that the shrinkage ratio is 7% or less.

Although the minimum of the shrinkage ratio is not limited, taking manufacturability and the like into consideration, it is preferable to use a material having a shrinkage ratio of 2% or more after being left at a high temperature of 120° C. for 120 hours.

Figure 4:
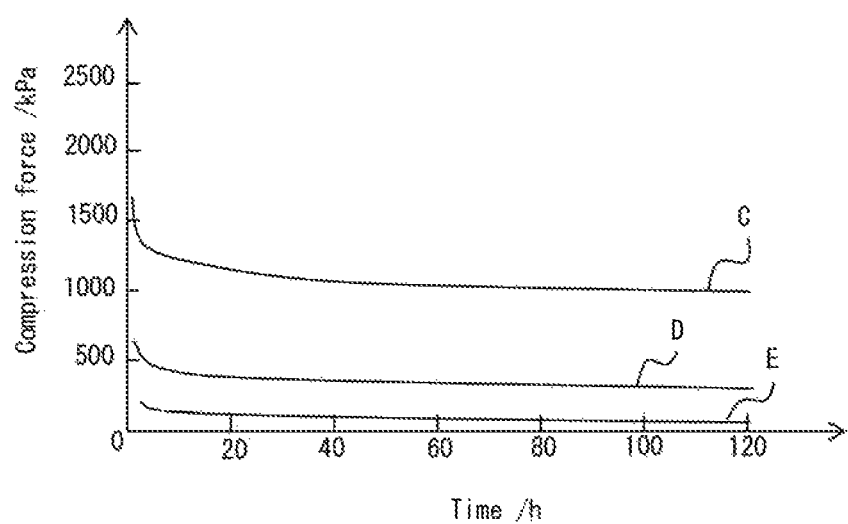
FIG. 4 is a schematic view showing a profile of compression force at a high temperature.

FIG. 4 is a drawing showing a profile of compression force of resin at a high temperature. Curves C, D, and E in FIG. 4 are for the resin to which displacement corresponding to the compression rates at the cover crimping portion of 50%, 80%, and 90% is given, respectively. Predetermined displacement is given to each of test pieces of the resin so as to obtain the above compression rates and its repulsive force is measured. The obtained change in repulsive force is shown as the change in compression force.

As shown in FIG. 4, in a case of curve C in which the compression rate is small (amount of compression is large), sufficient compression force can be maintained after being held at a high temperature. On the contrary, in cases of curves D and E in which the compression rates are large (amount of compression is small), compression force is low and, particularly for the curve E, compression force is 95 kPa or less. This is below the passing mark of a leaking test, which will be described later, and may lead to water entry. Consequently, the compression rate is preferably 80% or less. In a case in which the compression rate exceeds 80%, the compression rate may be 80% or more if the compression rate of 95 kPa or more can be obtained. However, to obtain high adhesive force between the cover portion 27 and the cover crimping portion 9, the compression rate is required to be 90% or less at minimum.

In addition, although there is no limit for the minimum value of the compression rate, it in preferable that the compression rate is 50% or more to prevent the cover portion 27 from crushing and breaking.

Here, the compression rate can be expressed as A1/A0, whereas A0 a total cross sectional area of the covered conductive wire 23 at the cover portion 27 before crimping and A1 is an inner total cross sectional area of the cover crimping portion 9 after crimping.

Figure 5:
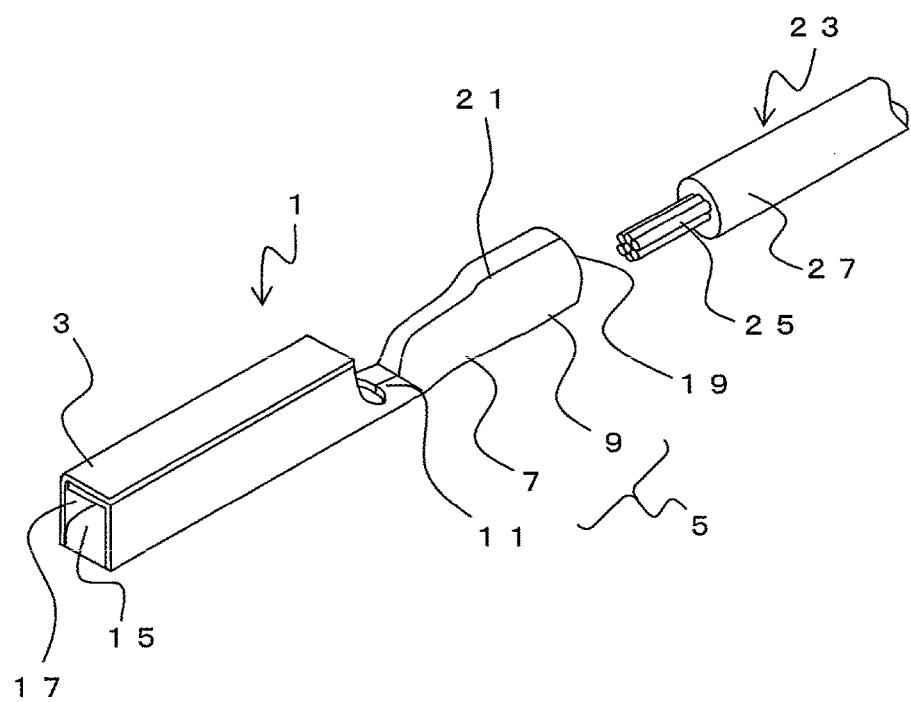
FIG. 5 is an exploded perspective view of the terminal-equipped electrical wire 10.

Next, a process of forming a terminal-equipped electrical wire will be described. FIG. 5 is an exploded perspective view showing a state before the covered conducive wire 23 is inserted into the terminal 1. First, as shown in FIG. 5, a predetermined length of the cover portion 27 at the tip of the covered conductive wire 23 is removed to expose the conductive wire 25. Next, the covered conductive wire 23 is inserted into the tubular crimping portion 5. At this time, the exposed part of the conductive wire 25 is positioned inside the conductor crimping portion 7, and the cover portion 27 is positioned inside the cover crimping portion 9.

As mentioned above, the crimping portion 5 is rolled up into a substantially tubular shape and its edge parts are joined together at the joint portion 21. In addition, the sealed portion 11 is provided at the front-end portion of the crimping portion 5 (on the side of the terminal body 3). That is, the crimping portion 5 is sealed except for the rear-end portion 19 into which the covered conductive wire 23 is inserted.

Figure 6:
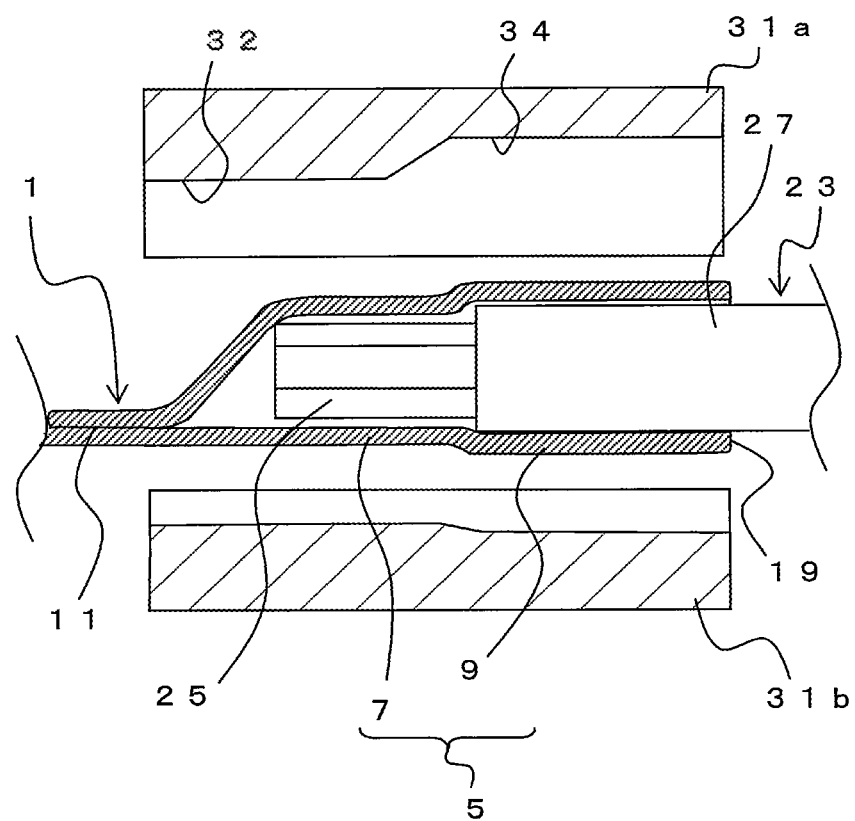
FIG. 6 (*a*) is a cross-sectional view showing a crimping portion 5 disposed between a mold 31*a* and a mold 31*b* before crimping.
Figure 6:
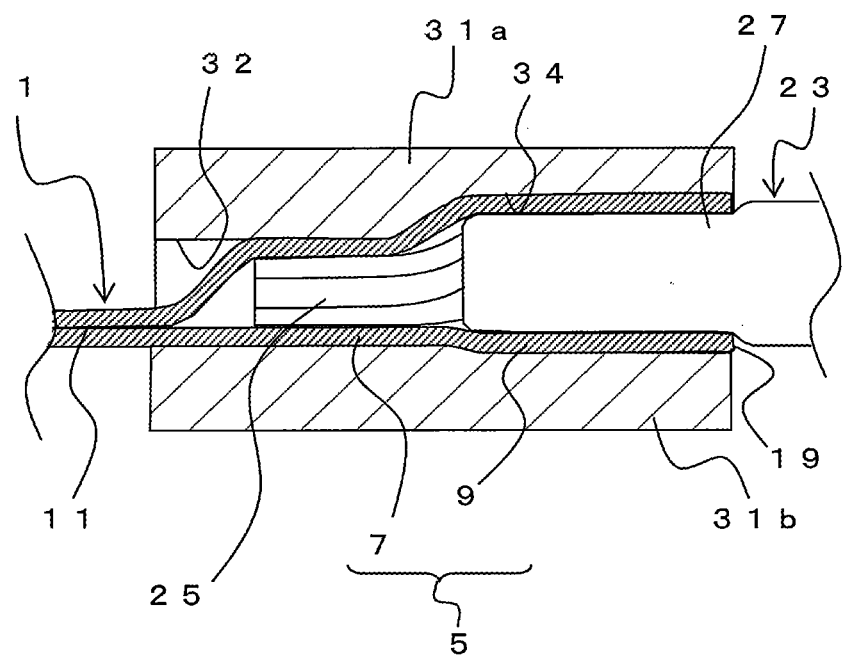

FIG. 6(*a*) is a cross-sectional view showing the molds 31*a* and 31*b* and the like before crimping, and FIG. 6(*b*) is a cross-sectional view showing the crimping portion 5 during crimping. The mold 31*a* has a semi-tubular cavity extending in the longitudinal direction, and includes a large-diameter portion 34, which corresponds to the cover crimping portion 9 and has a radius slightly smaller than the radius of the cover crimping portion 9, and a small-diameter portion 32, which corresponds to the conductor crimping portion 7 and has a radius smaller than the larger-diameter portion 34. The mold 31*b* has a semi-tubular cavity extending in the longitudinal direction, and the radii of the parts corresponding to the conductor crimping portion 7 and the cover crimping portion 9 differ in a similar way as in the mold 31*a*. The large-diameter portion 34 is a part that crimps the cover crimping portion 9, and the small-diameter portion 32 is a part that crimps the conductor crimping portion 7.

As shown in FIG. 6 (*b*), the molds 31*a* and 31*b* are meshed together to compress the crimping portion 5 so that the crimping portion 5 is crimped to the conductive wire 25 and the cover portion 27. In this way, the terminal-equipped electrical wire 10 is manufactured.

This terminal-equipped electrical wire 10 according to the present invention is used in motor vehicles and the like for example, and there is a case in which the terminal-equipped electrical wire 10 may be exposed to a high temperature condition such as inside an engine compartment. Thus, for those uses, it is required that water tightness is still maintained at high temperatures.

To withstand such high temperatures, water tightness must be maintained when, for example, being left at a high temperature of 120° C. for 120 hours. However, if the shrinkage ratio of the resin forming the cover portion 27 is large as mentioned above, it is difficult to maintain sufficient compression force after being left at a high temperature. That is, the stress generated on the covering portion 27 is relaxed, lowering adhesive force between the cover portion 27 and the cover crimping portion 9, so that it may not be possible to obtain the desired water lightness.

Meanwhile, as mentioned above, it is possible to maintain the required compression force by making the compression rate at the time of crimping small, even if stress relaxation occurs at a high temperature. However if the cover portion 27 is formed of hard resin or the thickness of the cover portion 27 is too thin for example, it may be difficult to make the compression rate small enough. For this reason, the compression rate for crimping the cover portion 27 is required to be relatively large. In this case, the compression force may immediately fall below the desired value due to the stress relaxation caused by the shrinking of the cover portion 27.

However, with the large compression rate, water tightness can still be obtained if the cover portion 27 and the cover crimping portion 9 are adhered with certainty. That is, the crimping portion 5 can be sealed by adhering the inner surface the cover crimping portion 9 with the outer surface at the cover portion 27. At this time, parts of the crimping portion 5 other than the rear-end portion 19 are sealed water-tightly by the joint portion 21 and the sealed portion 11, and thus the moisture entry into the crimping portion 5 can be prevented.

In the prevent invention, such an influence of the stress relaxation can be reduced by setting the shrinkage ratio of the cover portion 27 in a proper range. For example, when the compression rate is relatively high as 80%, it is possible to suppress the decreasing of the compression force under high temperature and to obtain restored water tightness.

As in the present embodiment described above, the terminal-equipped electrical wire 10 having an excellent water cut-off performance can be manufactured by properly setting the shrinkage ratio of the resin forming the cover portion 27. For example, the compression force can be maintained even for the resin having a relatively large compression rate and being held at a high temperature.

Second Embodiment

Figure 7:
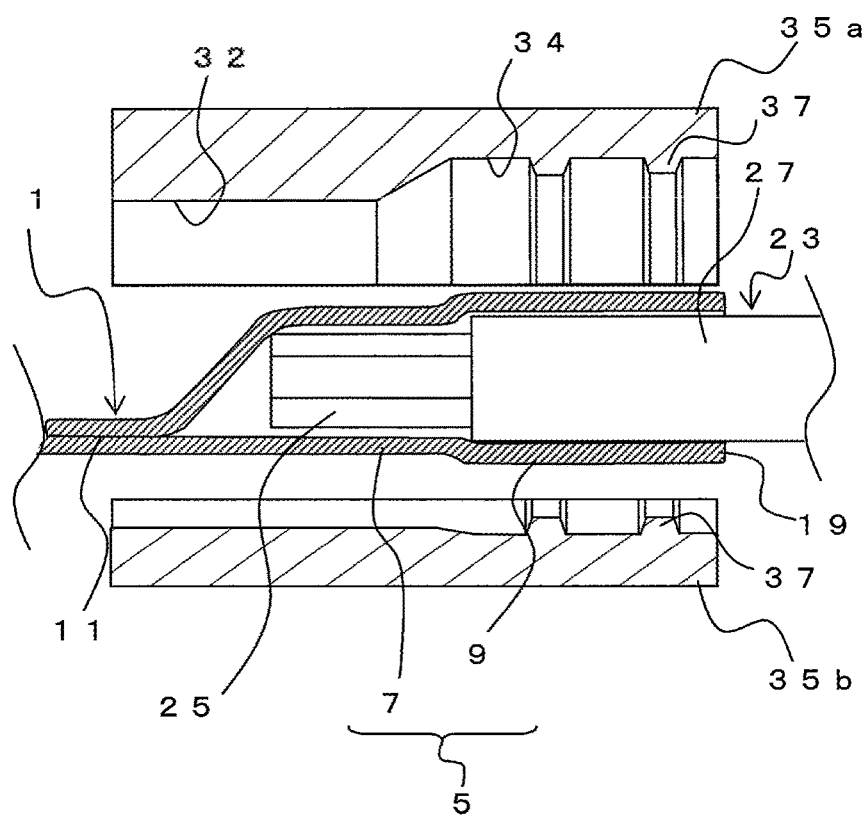
FIG. 7 (*a*) is a cross-sectional view showing the crimping portion 5 disposed between a mold 35*a* and a mold 35*b* before crimping.
Figure 7:
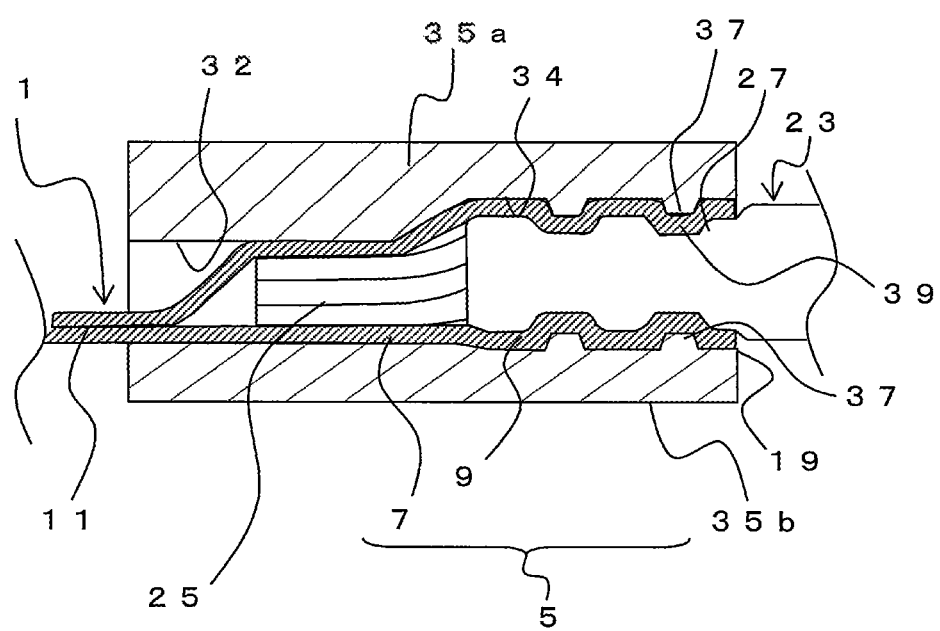

Next, a second embodiment will be described. FIG. 7 (*a*) and FIG. 7 (*b*) are drawings to show a crimping process according to the second embodiment. FIG. 7 (*a*) is a cross sectional view showing molds 35*a* and 35*b* and the like before crimping and FIG. 7 (*b*) is a cross sectional view showing the crimping portion 5 during crimping. In the descriptions below, the same notations as in FIG. 6 (*a*), FIG. 6 (*b*), and the like will be used for the same structure as in the first embodiment and redundant descriptions will be omitted.

The second embodiment is configured almost as the same as the first embodiment except that protruded linear-portions 39 are formed on the cover crimping portion 9 in a crimping step.

Each of the molds 35*a* and 35*b* has protruding portions 37 formed, which protrude inward. The protruding portions 37 are continuous in circumferential direction on inner circumferential surfaces of the molds 35*a* and 35*b*. That is, when the molds 35a and 35b are put together, the protruded portions 37 are continuous in ring shapes in the inner circumferential direction of the molds 35a and 35b. The parts of outer circumferential surfaces of the cover crimping portion 9 corresponding to the protruding portions 37 of the molds 35a and 35b are pushed in strongly. Thus, on the inner circumferential surface of the cover crimping portion 9, the protruded linear-portions 39 that protrude toward the inner side of the diameter direction are formed at the parts corresponding to the protruded portions 37 of the molds 35a and 35b. That is, recessed grooves corresponding to the linear-portions 39 are formed on the outer circumferential surface of the linear-portions 39 of the cover crimping portion 9.

The protruded linear-portions 39 are the parts having smaller diameters than the other parts. The number of arrangement of the protruded linear-portions 39 is not necessarily two as shown in the drawing, but should be at least one. However, to improve water cut-off performance, it is preferable that two or more rows of protruded linear-portions 39 are formed at intervals.

By providing the ring shaped protruded linear-portions 39 on the cover crimping portion 9 in its circumferential direction as above, some parts of the cover portion 27 are crimped by the protruded linear-portions 39 with stronger force than the other parts, forming highly crimped parts. As a result, a further enhanced water cut-off performance can be obtained.

According to the second embodiment, the same effects as in the first embodiment can be obtained. In addition, with the protruded linear-portions 39, further enhanced water cut-off performance can be obtained. In addition, since the protruded linear-portions 39 are formed in the crimping step, the linear protruded-portions do not get in the way when the covered conductive wire 23 is inserted.

WORKING EXAMPLES

Figure 8:
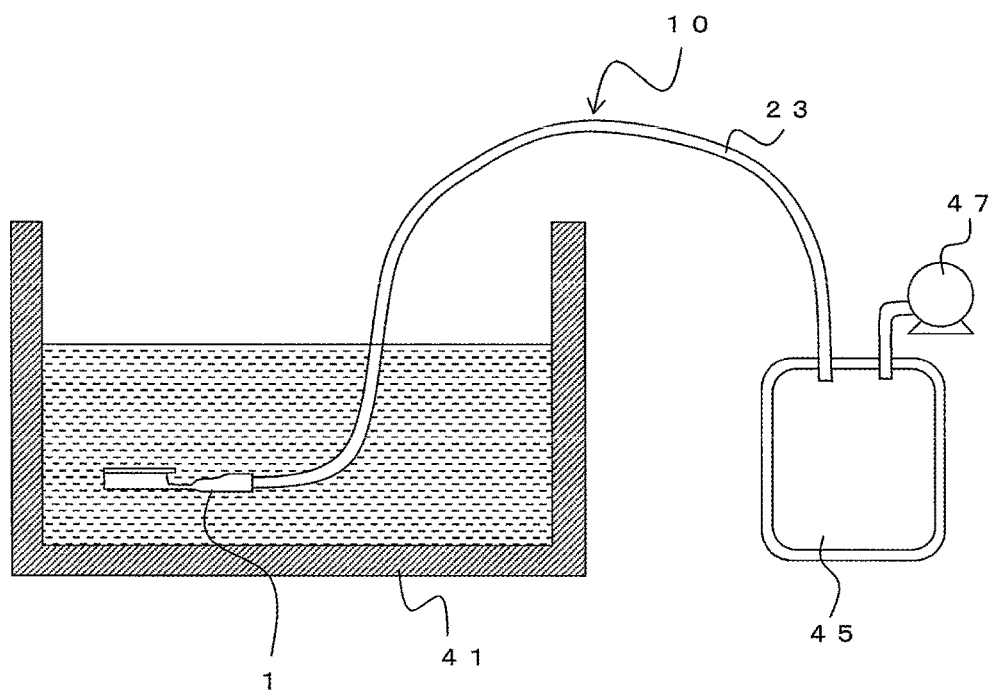
FIG. 8 is a schematic view showing a testing device.

First, to evaluate water leakage, a negative pressure is given to a covered conductive wire side of a terminal-equipped electrical wire that has gone through heating test. FIG. 8 shows an outline of the evaluation method. Evaluation was done by placing the terminal 1 crimped to the covered conductive wire 23 into a water tank 41, inserting an end part of the 150 mm long covered conductive wire 23 into a container 45, and applying a negative pressure using a pump 47 so that the pressure inside the container 45 is kept at −30 kPa for ten minutes.

The compression rate of each of the terminal-equipped electrical wires provided for the test is varied between 40% and 90%. In addition, the cover shrinkage ratios are varied by changing the various factors, such as materials and thickness of the cover portion 27 of the covered conductive wire 23 or heating conditions. The shrinkage ratio of the cover portion 27 according to each of the heating conditions is calculated in advance from the method illustrated in FIG. 3. To obtain various shrinkage ratios, some samples were left for 120 hours at a high temperature of, not 120° C., but higher. In other words, samples with larger shrinkage ratios were also used. The samples were tested for ten times (n=10) under each conditions. The results are shown in Table 1.

TABLE 1

|  | Compression rate % | Cover shrinking factor | | | | |
|---|---|---|---|---|---|---|
|  |  | 2% | 5% | 7% | 9% | 11% |
| With protruded linear-portions | 40% | average | average | average | average | average |
|  | 50% | excellent | excellent | excellent | excellent | excellent |
|  | 60% | excellent | excellent | excellent | excellent | excellent |
|  | 70% | excellent | excellent | excellent | excellent | excellent |
|  | 80% | excellent | excellent | excellent | excellent | excellent |
|  | 85% | excellent | excellent | excellent | good | good |
|  | 90% | good | good | good | average | average |
| Without protruded linear-portions | 40% | average | average | average | average | average |
|  | 50% | excellent | excellent | excellent | average | average |
|  | 60% | excellent | excellent | excellent | average | average |
|  | 70% | excellent | excellent | excellent | average | average |
|  | 80% | excellent | excellent | excellent | average | average |
|  | 85% | excellent | excellent | excellent | average | average |
|  | 90% | good | good | good | average | bad |

In Table 1, "excellent" means 100% pass, "good" means 80% to 90% pass, "average" means 50% to 70% pass, and "bad" means pass under 50%. As for the protruded linear-portions, the terminals with or without the protruded linear-portions 39 illustrated in FIG. 7 (b) were evaluated.

Some of the samples with compression rate of 40% had a break in the cover. The evaluations for the samples with compression rates in a range of 50% to 85% and cover shrinkage ratios in a range of 2% to 7% were all "excellent", regardless of the existence of the protruded linear-portions. On the contrary, the samples without the protruded linear-portions and with cover shrinkage ratios over 7% had a pass rate of 70% or less.

Figure 9:
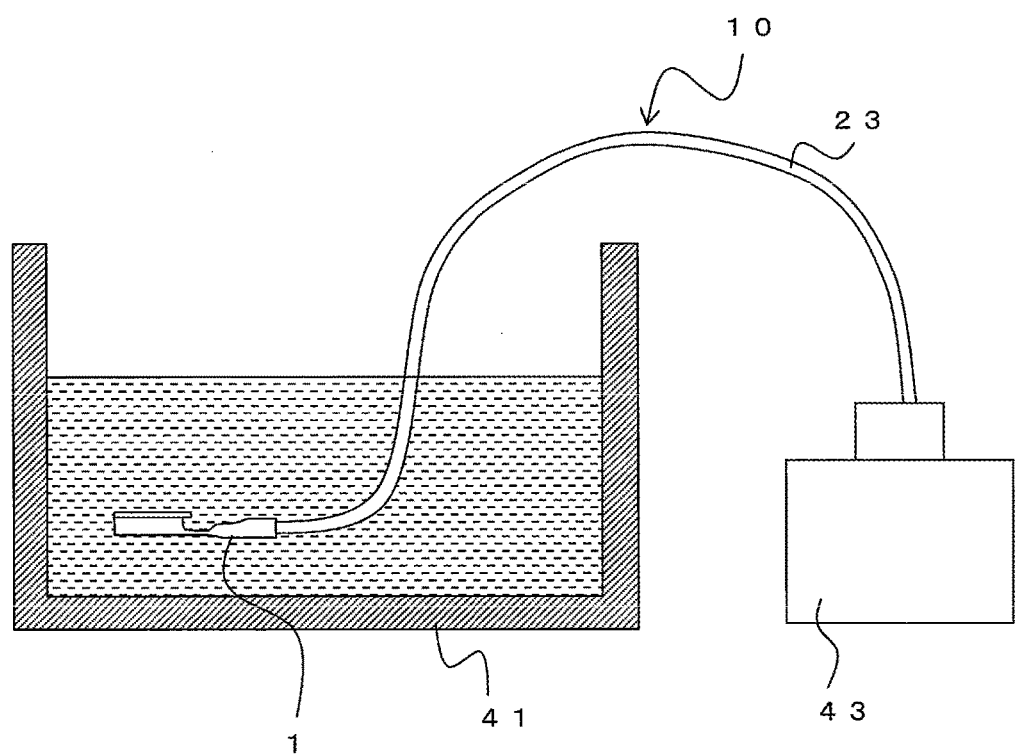
FIG. 9 is a schematic view showing another testing device.

Next, as a severer test, a terminal-equipped electrical wire that has gone through heating test was tested for air leakage. First, air is supplied from the cover portion of the covered conductive wire toward the terminal to evaluate whether air leaks from the rear end portion or not. FIG. 9 shows an outline of the evaluation method. Evaluation was done by placing the terminal 1 crimped with the covered conductive wire 23 into the water tank 41, and supplying pressured air (30 kPa) for one minute from an end portion of the 150 mm long covered conductive wire 23 to the terminal 1 using a regulator 43.

The terminal-equipped electrical wires provided for this test are the same as in the above-mentioned negative pressure test. The results are shown in Table 2.

TABLE 2

| | Compression rate % | Cover shrinking factor | | | | |
|---|---|---|---|---|---|---|
| | | 2% | 5% | 7% | 9% | 11% |
| With protruded linear-portions | 40% | average | average | average | average | bad |
| | 50% | good | good | good | average | bad |
| | 60% | good | good | good | average | bad |
| | 70% | good | good | good | average | bad |
| | 80% | good | good | good | average | bad |
| | 85% | good | good | good | average | bad |
| | 90% | good | good | average | bad | bad |
| Without protruded linear-portions | 40% | average | average | average | average | bad |
| | 50% | good | good | good | bad | bad |
| | 60% | good | good | good | bad | bad |
| | 70% | average | average | bad | bad | bad |
| | 80% | average | average | bad | bad | bad |
| | 85% | average | average | bad | bad | bad |
| | 90% | average | average | bad | bad | bad |

Some of the samples with compression rate of 40% had a break in the cover. For the samples with the protruded linear portions and having compression rates in a range of 50% to 85% and cover shrinkage ratios between 2% and 7%, the evaluations were all "good". For the samples without the protruded linear portions having compression rates in a range of 50% to 60% and cover shrinkage ratios between 2% and 7%, the evaluations were also all "good". On the contrary, the samples with cover shrinkage ratios over 7% had a pass rate of 70% or less.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and if will be understood that they naturally belong to the technical scope of the present invention.

For example, although aluminum is used for the electrical wires in the working examples, it is not limited thereto and copper may be used for the electrical wires.

In addition, a plurality of the terminal-equipped electrical wires of the present invention may be bundled in use. In the present invention, such a structure of a plurality of the terminal-equipped electrical wires bundled together is called a wire harness structure.

DESCRIPTION OF NOTATIONS

1 . . . terminal
3 . . . terminal body
5 . . . crimping portion
7 . . . cover crimping portion
9 . . . conductor crimping portion
10 . . . electrical wire with terminal
11 . . . sealed portion
15 . . . elastic contacting piece
17 . . . front-end portion
19 . . . rear end portion
21 . . . joint portion
23 . . . covered conductive wire
25 . . . conductive wire
27 . . . cover portion
31a, 31b, 35a, 35b . . . mold
32 . . . small-diameter portion
34 . . . large-diameter portion
37 . . . protruding portion
39 . . . protruded linear-portion
41 . . . water tank
45 . . . regulator
45 . . . container
43 . . . vacuum pump

What is claimed is:

1. A terminal-equipped electrical wire including a covered conductive wire connected with a terminal, wherein:
the terminal includes a crimping portion, which crimps the covered conductive wire, and a terminal body;
the crimping portion is in a tubular shape having a closed end, the crimping portion including a cover crimping portion, which crimps a cover portion of the covered conductive wire, and a conductor crimping portion, which crimps a conductive wire exposed from the cover portion; and
a resin forming the cover portion shrinks by a factor of 7% or less after being left at a high temperature of 120° C. for 120 hours.

2. The terminal-equipped electrical, wire according to claim 1, wherein:
the a compression rate of the cover crimping portion is 80% or less.

3. The terminal-equipped electrical wire according to claim 1, wherein:
the cover crimping portion includes a protruded linear-portion that protrudes toward an inner surface of the cover crimping portion and is provided as a ring shape in a circumferential direction; and
a recess groove corresponding to the protruded linear-portion is formed on an outer circumference surface of the protruded linear-portion.

4. The terminal-equipped electrical wire according to claim 3, wherein:
a plurality of the protruded linear-portions are provided at intervals in a longitudinal direction of the cover crimping portion.

5. A wire harness structure, wherein:
a plurality of the terminal-equipped electrical wires according to claim 1 are bundled together.

6. A wire harness structure, wherein:
a plurality of the terminal-equipped electrical wires according to claim 2 are bundled together.

7. A wire harness structure, wherein:
a plurality of the terminal-equipped electrical wires according to the claim 3 are bundled together.

8. A wire harness structure, wherein:
a plurality of the terminal-equipped electrical wires according to claim 4 are bundled together.

* * * * *